Aug. 9, 1949.  G. H. ALVEY  2,478,885
CONTINUOUS METHOD AND APPARATUS
FOR PRODUCING PLASTICS
Filed Nov. 23, 1945

GLENN H. ALVEY
INVENTOR.

BY Lester B Clark
Ray L. Smith
ATTORNEYS

Patented Aug. 9, 1949

2,478,885

UNITED STATES PATENT OFFICE 2,478,885

CONTINUOUS METHOD AND APPARATUS FOR PRODUCING PLASTICS

Glenn H. Alvey, San Antonio, Tex., assignor to Uvalde Rock Asphalt Company, Bexar County, Tex., a corporation Application November 23, 1945, Serial No. 630,327

3 Claims. (Cl. 18—2)

1

This invention relates to the production of a plastic mixture and more particularly to the production of a strip or particles of a coloring or colored material of this type.

In the production of marbleized particles such as slabs or strips as disclosed in the co-invention of Letters Patent Number 2,314,062, it is desirable that particles of a marbleizing material of uniform size and color be provided for best results. It is the primary object of this invention to provide method and apparatus for producing such a marbleizing material.

It is also an object of the invention to provide novel and simple method and apparatus whereby a strip of plastic material is produced.

Another object is to progressively effect intimate admixture of the plastic ingredients so that, at a point in the mixing operation, the resulting material of uniform consistency and color can be withdrawn in strip form.

Still another object is to effectively convert the strip of plastic material into particles of a desired size or sizes.

The foregoing objects together with other objects and advantages of the invention will be more fully apparent from the following description considered in connection with the accompanying drawings in which.

Figure 1:
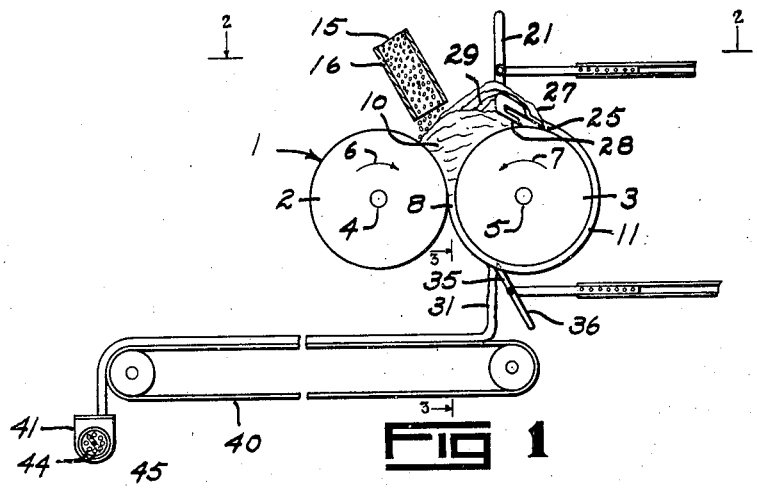
Fig. 1 is a diagrammatic and elevational view indicating one form of apparatus and the manner of carrying out the method of the invention.
Figure 2:
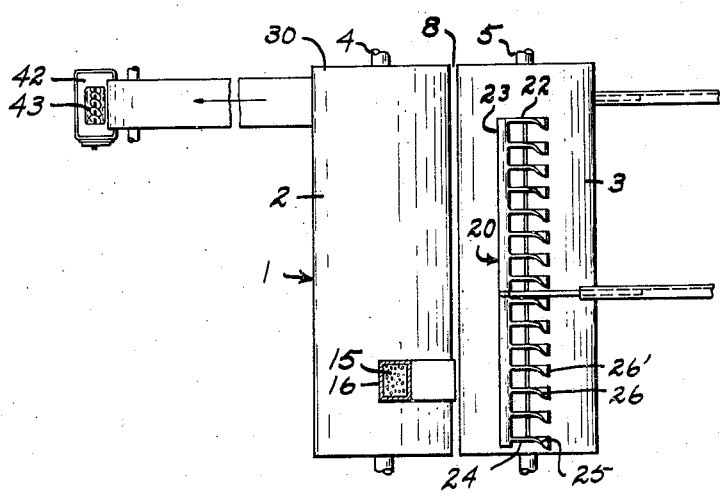
Fig. 2 is a plan view of the apparatus shown in Fig. 1 along line 2—2.
Figure 3:
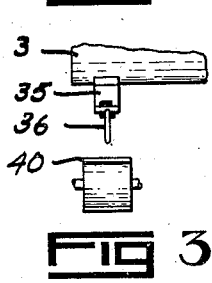
Fig. 3 is a detail view showing the relative positions of parts as viewed on line 3—3 in Fig. 1.

In their illustration of one embodiment of the apparatus of the invention, which apparatus is capable of carrying out the method, the drawings show a calendering machine 1 comprising rolls 2 and 3 rotatable upon or with the shafts 4 and 5 in the directions indicated by the arrows 6 and 7. It is to be understood that the rolls 2 and 3 are spaced apart at 8 as is well known in in the art so that the mass 10 of material (Fig. 1) disposed upon the rolls is kneaded and passes therebetween to form the sheath 11 upon the roll 3.

The rolls 2 and 3 are heated to a required extent, depending upon the thermal characteristics of the material which is supplied to form the mass 10 from a premixed material 15 introduced at a predetermined rate through the spout 16 proximate one end of the rolls. The roll 2 is heated to a higher temperature than is the roll 3 whereby there is a greater tendency for the

2 kneaded material to adhere to the latter whereby the sheath 11 forms thereon.

Preferably, though not necessarily, the material 15 comprises ingredients that will produce a thermoplastic or a thermo-setting product. Inasmuch as numerous such products are well known and the invention is not confined to any particular material, reference is not here made to specific products of this type.

Tiltably mounted above the roll 3 is a stripping knife 20 of special construction and operable by lever 21 to sever and remove strips of material 11 from the roll 3. This knife extends the major portion of the length of the rolls 2 and 3 and includes a plurality of stripper blades 22 which are integral with and extend outwardly from the bar 23. The inner ends 24 of these blades are relatively thin and lie in substantially vertical planes, but their outer ends are rotated approximately 90 degrees to form displacement surfaces 25 and horizontal lifting surfaces 26 having leading edges 26'. It is intended that the portion 26 shall be movable into substantially tangential contact with the cylindrical surface of the roller 3 whereby a desired stripping action is effected upon the sheath 11 of material thereon.

When the knife 20 is tilted as shown in Fig. 1, the striper blades 22 enter the sheath 11 and cut strips 27 therefrom, lift such strips and deposits them in the heterogeneous mass 10 extending longitudinally upon the rolls 2 and 3. Furthermore, because of the structure of the stripper blades 22, as just described, there is a constant displacement of the strips 27 by the surfaces 25 along the rolls 2 and 3 while at the same time progressive mixing of the materials takes place.

The knife 20 also includes a trailing edge or blade 28 having an edge which likewise moves into engagement with the periphery of the roll 3. Hence this blade 28 severs the remaining or intermediate strips 29 of the material comprising the sheath 11 and these strips are likewise deposited upon the mass 10 of the material upon the rolls.

It seems apparent that as the strips 27 are constantly moved axially of the calender rolls 2 and 3, and are at the same time intermingled and admixed with the material of the intervening strips 29, thorough mixing of the material constituting the sheath 11 is effected as the material progressively moves toward the end portion 30 of the rolls. This produces a material that is uniform as to color and the distribution of ingredients therein, and this material forms a strip 31 upon the surface 30, which strip is removed from the rolls in a manner and by means of mechanism which will now be described.

Located beneath the roll 3 is a blade 35 of limited length and which underlies the end portion 30 of the rolls. It therefore lies in the path of the strip 31 of material formed upon the roll 3. This blade is movable by means of the lever 36 to either active or inactive positions.

The strip 31 of material removed from the roll 3 is deposited upon a conveyor belt 40 whence it is conducted to a suitable point. This strip may be used as a stock strip or may be subjected to further treatment and/or forming operations.

When the material of the strip 31 is to be divided into small particles for use in marbleizing, in accordance with the primary object of the invention, it is fed into a device such as that shown at 41. This device is of the pug-mill type and comprises a housing having an opening 42 to receive the strip 31. Within the housing the strip is advanced longitudinally thereof by means of the conveyor 43 to and through the openings 44 in the end of the housing. The extruded rodlike material is cut at intervals by the rotating blade 45. By selecting a conveyor 43 of suitable pitch and using openings 44 of a desired size or sizes and number, it seems apparent that the strip 31 is converted into particles of a predetermined size or sizes.

By way of supplementing the description of the operation of the device it will be assumed that the knife 20 is lifted by means of the lever 21 so that continued kneading and mixing action upon the material 10 and the sheath 11 are effected by the continued rotation of the rolls 2 and 3. The knife may then be partly or fully lowered whereby stripping action, as above described, takes place. This stripping action both enhances the mixing and displaces the material along the rolls 2 and 3 thus forming that portion of the sheath which produces the strip 31. This strip may be continuously or intermittently removed by means of the knife 35 by proper manipulation of the lever 36.

Broadly the invention comprehends method and apparatus for producing a plastic material of uniform color and composition.

I claim:

1. The method of producing a plastic material comprising the steps of, depositing upon calender rolls and proximate one end thereof a quantity of material to be formed into a sheath on one of the rolls during rotation thereof, severing and lifting spaced strips of the material from the sheath and displacing said strips along and upon the rolls, removing the intervening strips from the roll and feeding them to the space between the rolls, and removing the material in strip form from the roll at a point displaced from the point of deposit of raw material thereon.

2. The method of producing a plastic material comprising the steps of, depositing upon calender rolls and proximate one end thereof a quantity of material to be formed into a sheath on one of the rolls during rotation thereof, severing spaced strips of the material from the sheath and displacing said strips along and upon the rolls, removing the intervening strips from the roll and feeding them to the space between the rolls, removing the material in strip form from the roll at a point displaced from the point of deposit of raw material thereon, and comminuting the material of said strip whereby particles of said material of uniform consistency and color are provided.

3. In a device of the class described, a pair of calendering rolls, means for depositing raw materials thereon, a cutter blade mounted proximate one of said rolls, said cutter blade being constructed and arranged to sever and lift spaced strips from one of the rolls and to displace such strips axially and upon the rolls, whereby the material moves axially of the rolls during kneading thereof by the rolls and additional means for removing the intervening strips from said one roll and depositing said intervening strips upon the rolls.

GLENN H. ALVEY.

REFERENCES CITED

The following references are of record in the file of this patent:

UNITED STATES PATENTS

| Number | Name | Date |
| --- | --- | --- |
| 2,314,062 | Alvey et al. | Mar. 16, 1943 |
| 2,319,040 | Conklin | May 11, 1943 |